Jan. 2, 1934.   D. W. VOLTZ   1,942,314
BODY CONSTRUCTION
Filed Aug. 21, 1930    8 Sheets-Sheet 1

Jan. 2, 1934.                D. W. VOLTZ                1,942,314
                          BODY CONSTRUCTION
                   Filed Aug. 21, 1930        8 Sheets-Sheet 3

Inventor:
Daniel W. Voltz

Witness:
William P. Kilroy

Jan. 2, 1934.　　　D. W. VOLTZ　　　1,942,314
BODY CONSTRUCTION
Filed Aug. 21, 1930　　8 Sheets-Sheet 4

Jan. 2, 1934.  D. W. VOLTZ  1,942,314
BODY CONSTRUCTION
Filed Aug. 21, 1930  8 Sheets-Sheet 5

Jan. 2, 1934.   D. W. VOLTZ   1,942,314
BODY CONSTRUCTION
Filed Aug. 21, 1930   8 Sheets-Sheet 7

Patented Jan. 2, 1934

1,942,314

UNITED STATES PATENT OFFICE 1,942,314

BODY CONSTRUCTION

Daniel W. Voltz, Chicago, Ill., assignor to Voltz Brothers, Inc., Chicago, Ill., a corporation of Illinois Application August 21, 1930. Serial No. 476,748

7 Claims. (Cl. 296—30)

This invention relates to body constructions, and more particularly to a body construction adapted for use on trucks and the like.

The method of distributing perishable produce, such as garden vegetables, fruits, meats, and the like, has varied from past practice wherein it was customary to handle such produce in large quantities in refrigerator railroad cars which was not profitable for short hauls. In addition, such perishables are often produced in regions not served by railroads and, therefore, a difficult problem has been involved in the marketing thereof. This problem, however, has been to a great extent solved by the use of automotive trucks, especially in regions not served by railroads. Such trucks are also advantageously used in short hauls. Further, it has been the custom to establish central distributing points, especially in larger cities and towns, and to distribute perishable produce from these central points, and this has also been done by the use of automotive trucks.

The use of trucks, however, involves the problem of providing a suitable body, for it is necessary that refrigeration be provided for the perishable produce, and frequently the produce to be handled as, for example, meat, is of a nature that requires careful and special handling. Meat can best be handled by being suspended from suitable supports and a rigid construction must be provided when this is done in order to support the weight, which will often be of considerable proportions. Further, the manner of providing refrigeration has also involved considerable difficulties, but this has to a great extent been solved by the use of so-called Dry Ice, which is solid carbon dioxide. This latter, however, is relatively expensive. It is, therefore, highly advantageous to provide effective insulation in order to prevent waste of the refrigerating medium.

With the foregoing in mind, the salient objects of my invention are to provide a construction for bodies which may be used on trucks or the like and which will be so arranged that it may be expeditiously installed in position on the truck; to provide a body construction which will be substantial and sturdy in order that considerable weight may be suspended therein; to provide a body construction which will be effectively insulated in order that excessive use of a refrigerating medium will not be necessary; to provide a body construction which may be formed in compartments; and to provide simple interchangeable brackets so that a minimum number of different kinds will be required in the body construction and to otherwise arrange the body so that it may be very easily and economically manufactured.

In the accompanying drawings wherein selected embodiments of my invention are illustrated

Figures 4, 5:
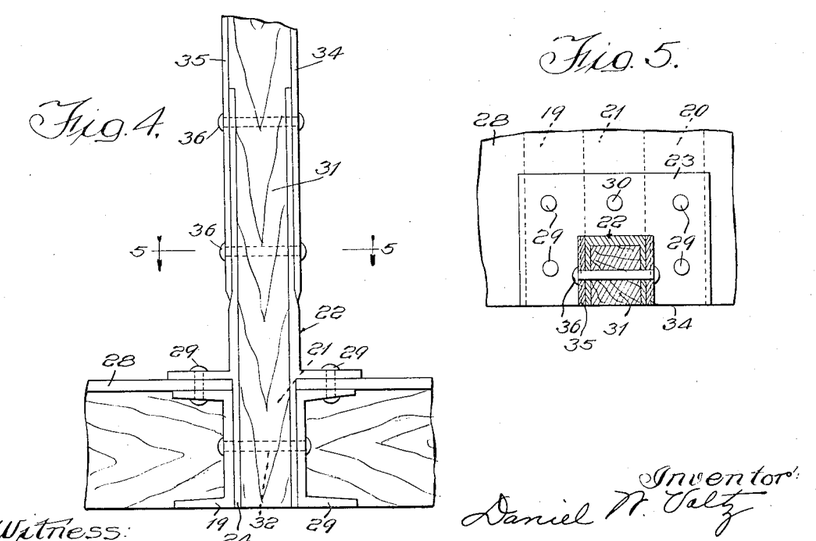
Fig. 4 is a detail view of the sill and riser construction.
Fig. 5 is a sectional detail view taken substantially on the line 5—5 on Fig. 4.
Figure 6:
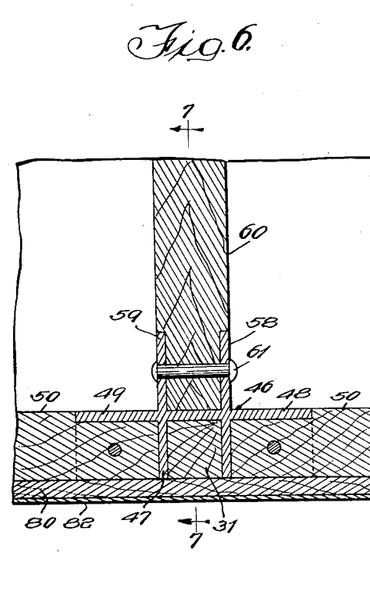
Fig. 6 is a sectional detail view taken substantially on the line 6—6 on Fig. 1.
Figure 12:
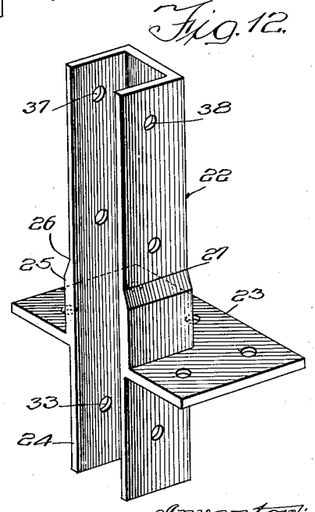
Figure 13:
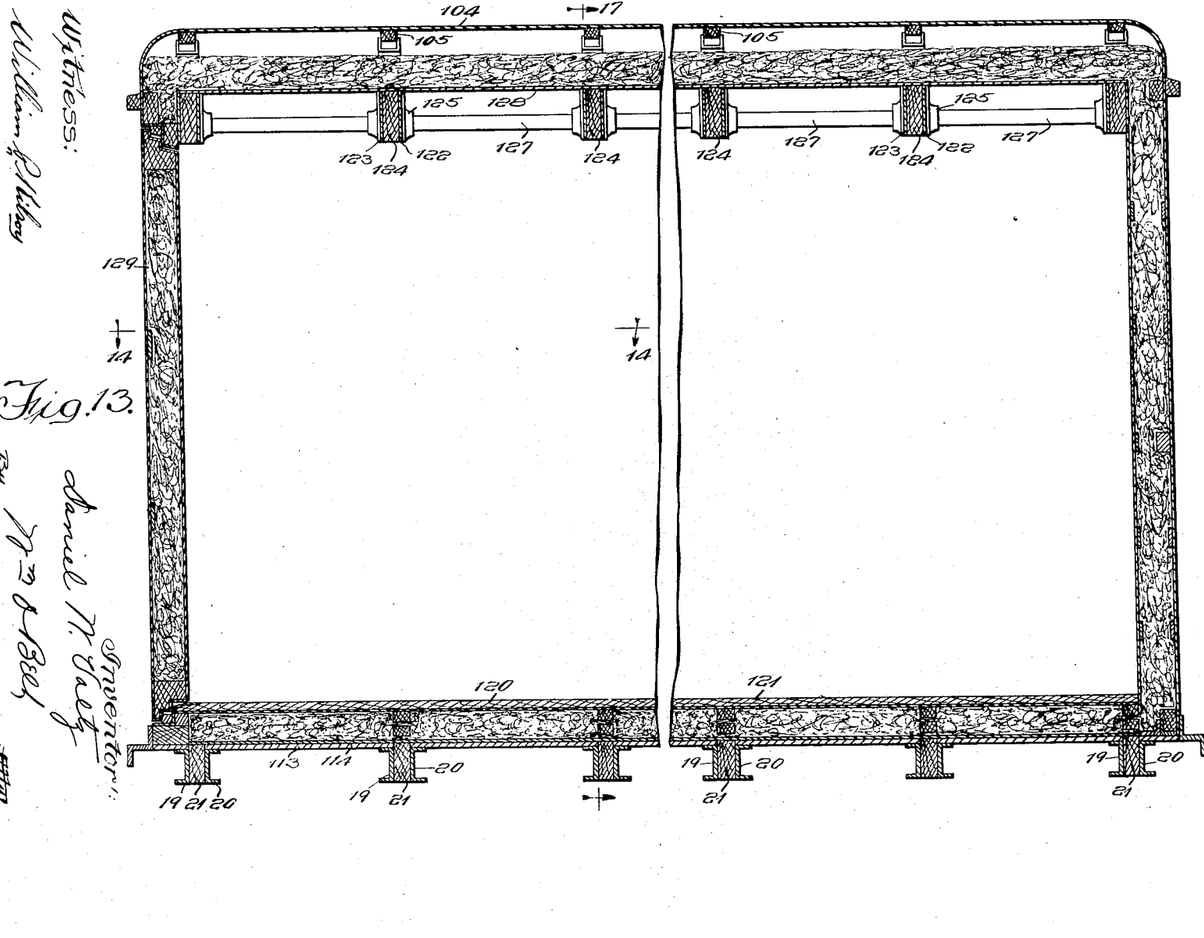
Fig. 13 is a longitudinal vertical sectional view of a modified construction of my improved body.

The improved body forming the subject matter of this invention is intended to be mounted on the chassis of trucks or the like which vary considerably in dimensions, in type of construction, and in disposition of elements and I, therefore, so arrange my improved body construction that it may be used with differently constructed chassis in a manner that will entail a minimum number of alterations. In order that this may be attained I provide a plurality of transversely extending cross members which form a supporting platform, and which, in the present instance, embody oppositely disposed channel irons 19 and 20 that are disposed in cooperating pairs with the flanges thereof extended in opposite directions. Between the body portions of the channel irons 19 and 20, wooden beams are arranged To certain of the cross members I secure relatively wide flat plates which may be drilled at suitable points whereby tie members may be extended therethrough to interconnect the plates and the chassis, and, as the plates will be suitably secured to the channel irons of the cross members, it is manifest that the platform may be expeditiously secured to the chassis. The wall portions of my body construction are mounted on the platform and are supported by a suitable skeleton frame. The beams 21, (Fig. 5) arranged between the channel irons 19 and 20, do not extend to the ends of the channel irons, and arranged at the ends of the beams 21 between the channel irons 19 and 20 are brackets, generally indicated by 22, and one of these brackets is illustrated in detail in Fig. 12. Each of the brackets 22 includes a plate 23 and depending below this plate is a unitary substantially U-shaped channel 24, and unitary with the depending channel 24 and aligned therewith is a channel 25 which extends above the plate 23, the sides of the channel 25 being reduced, as indicated at 26 and 27 whereby reenforcing pads are formed on the sides of the channel. The depending portions 24 of the brackets 22 are arranged to extend between the body portions of the channel irons 19 and 20 at each side of the platform. Disposed between the upper faces of the upper flanges of said channel irons and the lower faces of the plates 23, along each side of the platform, is a sill 28. Rivets, such as 29, secure together the flanges on the channel irons 19 and 20, the sills 28, and the plates 23, screws 30, or the like, extending through the plates 23 and sills 28 into the beams 21, as illustrated in Fig. 5, to connect the beams and the brackets. Disposed in the channels provided by the channel portions 24 and 25 of each bracket are wooden risers 31, and rivets 32, or other suitable securing devices, extend through the body portions of the channel irons 19 and 20, openings 33 in the sides of the channels 24, and through the risers 31, to secure the risers in the channels. Strips of metal, indicated by 34 and 35, are disposed on the reduced portions 26 and 27 of the sides of the channels 25, the risers 31 being recessed to receive these sides, and thus the strips 34 and 35 may extend upwardly along the side edges of the risers 31 in engagement therewith. Rivets, such as 36, extend through openings in the strips 35, openings 37 in one side wall of the channels 25, the risers 31, openings 38 in the other side walls of the channel, and openings in the strips 34. Thus, the rivets 36 serve to secure the metal side plates 34 and 35 to the brackets 22 and also serve to connect the risers to said brackets and to the strips, these rivets cooperating with the rivets 32 to retain the risers. The foregoing construction is one which, by reason of the wood included therein, will provide rigidity, combined with sufficient resiliency to maintain the body against distortion and weaving, and it also provides an arrangement which is not excessively rigid, as such an arrangement of the device tends to shear the retaining rivets.

Figure 1:
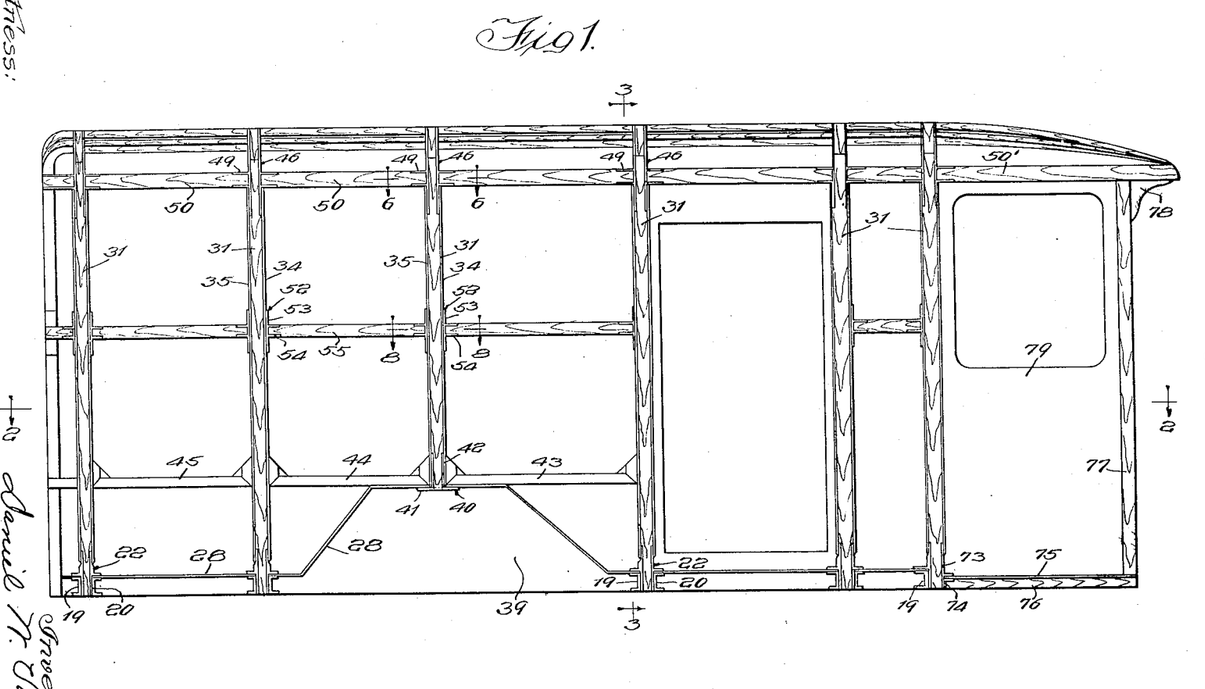
Fig. 1 is a side elevation showing the skeleton frame of my improved body construction.
Figure 2:
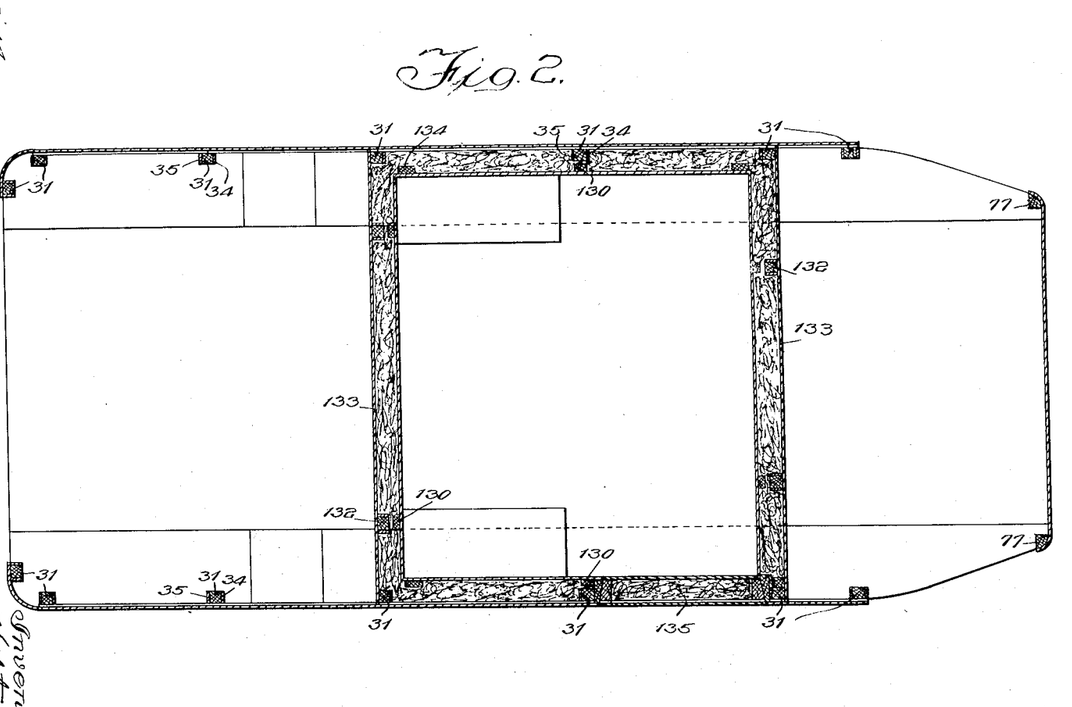
Fig. 2 is a horizontal section taken substantially on the line 2—2 on Fig. 1, showing the side walls and insulation in position.

The disposition of the risers 31 is best shown in Fig. 2, and by referring thereto it may be seen that risers are not only disposed along the side edge of the platform but also at the rear edge, but, risers are provided on the rear edge only adjacent the side edges. To reenforce the body and the risers, horizontally disposed vertically spaced reenforcements are provided between the risers. In some body constructions, clearance is provided for the rear wheels of the vehicle, and this is done by omitting one of the cross members, and the sills 28 are bent to extend upwardly at points adjacent each of the cross members adjacent to the omitted cross member, and the portions of the sill intermediate these upwardly extending portions are bent to extend horizontally.

Figure 3:
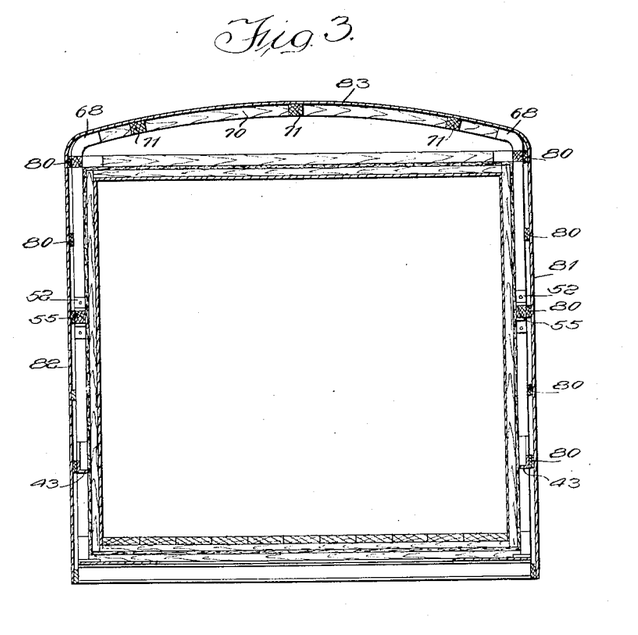
Fig. 3 is a vertical transverse section taken substantially on the line 3—3 on Fig. 1 and showing the walls arranged in position.
Figure 7:
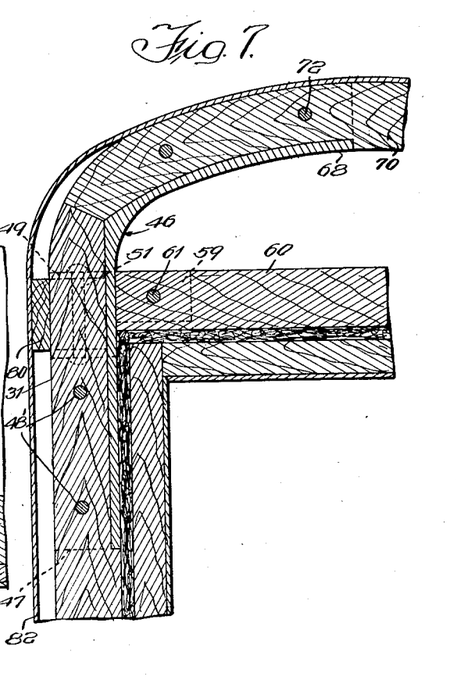
Fig. 7 is a sectional detail view taken substantially on the line 7—7 on Fig. 6.
Figure 8:
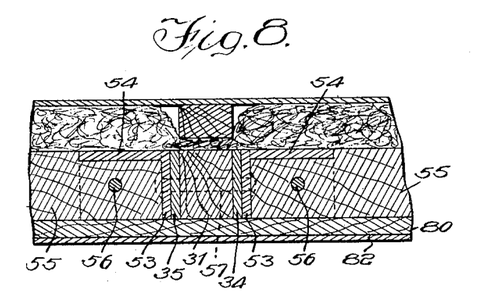
Fig. 8 is a sectional detail view taken substantially on the line 8—8 on Fig. 1.
Figure 9:
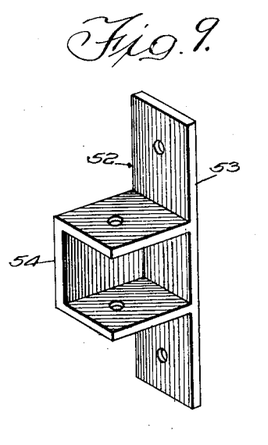
Figs. 9, 10, 11 and 12 are perspective views illustrating brackets employed in the body.
Figure 10:
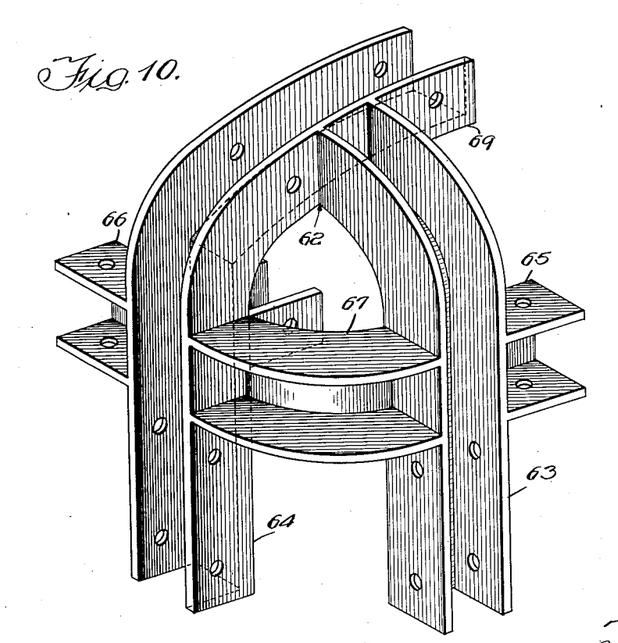
Figure 11:
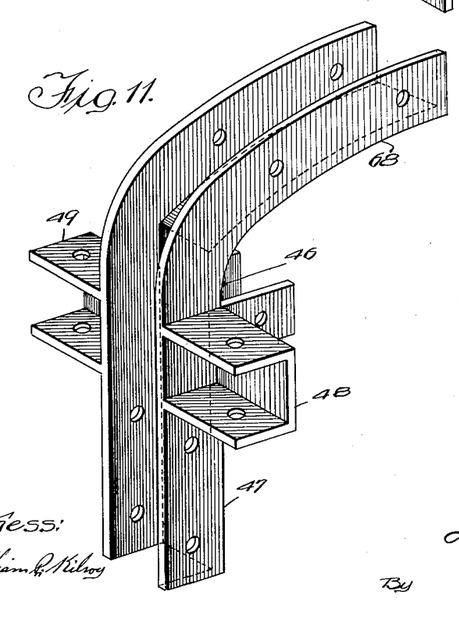

This arrangement provides a wheel housing 39 on each side of the body, and the wheels on the vehicle embodying the chassis extend into this wheel housing, when the body is mounted on a chassis. In this manner I am enabled to use a body which will extend beyond the rear wheels of the vehicle, and I am therefore enabled to increase the length of the body. Risers 31 are provided in alignment with the portion at which the cross member is omitted and the lower end of these risers abut the horizontally extending portions of the sills 28 intermediate the upwardly extending portions thereof. Instead of brackets 22, brackets, generally indicated by 40, are provided at the lower end of the last-named risers, which brackets include plate portions 41 that are disposed below the sills 28. These brackets also include channel portions 42, substantially similar to the channel portions 25, and side strips similar to the side strips 34 and 35 are connected to the channels 42 in the same manner as that in which the side strips 34 and 35 are connected to the brackets 22. Disposed to rest on the horizontally extending portions of the sills 28, intermediate the upwardly extending portions of the sills, are angle irons 43 and 44 which extend between the side plates of adjacent risers 31, and the end portions of these angle irons are riveted to the risers. The horizontally disposed portions of the sills 28, intermediate the upwardly extending portions, are riveted to the angle irons and are supported thereby to prevent warping or other distortion thereof. Angle irons 45 extend between the next to the last and the last of the risers 31 on both sides of the body and are riveted to the side plates of these risers, said angle irons 45 being arranged in horizontal alignment with the angle irons 43 and 44. On all but the rearwardmost of the risers 31 along the sides of the body and at the upper ends thereof, are brackets, such as 46 (Fig. 11). The brackets 46 include vertically extending channel portions 47 which are disposed between the side plates 34 and 35, and the side plates and channels 47 are secured by rivets 48' which pass through these members to bring about interconnection thereof. On the sides of the channels 47, adjacent the upper portion thereof, unitary with the brackets 46 and disposed to open in opposite directions, are channels 48 and 49. Beams or strips of wood 50 have end portions thereof extended into opposite of these channels on adjacent risers, and the end portions of the beams 50 are retained in the channels by rivets 51 (Fig. 7), or other suitable securing devices. The beams 50 extend between the various risers 31 and are parallel to, and spaced from, the angle irons 43 and 44. Intermediate the angle irons and the beams and secured to the side plates on the risers, are brackets, such as illustrated in Fig. 9 and generally indicated by 52. These brackets include flat plates 53 and extending outwardly therefrom are channels 54, and disposed to extend into the channels and arranged with opposite ends connected in channels on adjacent risers are wooden beams 55. The wooden beams 55 are retained in the channels 54 by rivets 56 (Fig. 8), or other suitable securing devices, and the plates 53 of the brackets 52 are connected to the risers and the side plates thereof by rivets, such as 57 (Fig. 8), it being understood that the brackets 52 on opposite sides of the risers 31 are aligned with each other. On the brackets 46 are plates 58 and 59 which are aligned with the side walls of the channel 47 but which extend in a direction at right angles thereto, and these plates are aligned with the channels 48 and 49. The ends of beams 60 are disposed between plates 58 and 59 on opposite sides of the body, and rivets, such as 61 extend through the plates 58 and 59 and the ends of the beams 60 to secure said beams in position. Since the beams 60 extend transversely of the body, these beams may be used as supports for the ceiling of a compartment or compartments to be provided in the body. The last of the risers 31 on the sides of the body and the risers 31 at the rear of the body are interconnected by corner brackets, generally indicated by 62 and illustrated in Fig. 10. The brackets 62 include channels 63 and 64 similar to the channels 47, and these channels are arranged at right angles to each other. As the channels 63 receive the upper ends of the last of the risers on each side of the body, while the channels 64 receive the upper ends of the risers 31 arranged at the rear of the body, it is necessary that the brackets 62 be oppositely formed for opposite corners of the body, the bracket 62, illustrated in Fig. 10, being intended for use at the upper left hand corner of the body, as viewed in Fig. 2. Plates, similar to the plates 58 and 59, are provided in alignment with the channels 63 and 64, and such plates, on opposite sides, of the body support a beam 60. Channels 65 and 66 are provided on the bracket 62, and these channels are substantially similar to the channels 48 and 49, and an arcuate channel 67 extends between the channels 63 and 64 in alignment with the channels 65 and 66 to provide a reenforcement for the channels 63 and 64, and also to provide a channel in which an arcuate strip of wood may be arranged to which the outside wall panels, to be described hereinafter, may be secured. The channels 47 and 64 include as extensions thereof channels 68 and 69, respectively, and these channels 68 and 69 are aligned with the channels 47 and 64 but are joined thereto by rounded portions so that the channels 68 and 69 extend substantially at right angles to the channels 47 and 64. Opposite ends of beams 70 (Fig. 3) are disposed in the channels 68 and 69 and the beams 70 are arcuated longitudinally of their length and provide roof beams. Short stub beams extend between the beams 70 at right angles thereto and at spaced intervals and provide reenforcements. Both the beams 70 and 71 are preferably made from wood to provide yieldability. The ends of the beams 70 are secured in position by rivets 72 (Fig. 7).

The forwardmost of the risers 31 have channel irons 19 arranged on the rearwardly disposed faces thereof, but on the front face the angle strip 20 is supplanted by L-shaped strips 73 and 74, which have the stem portions thereof disposed on the sides of the risers, while the foot portions thereof are arranged in juxtaposition and received therebetween are sill plates 75. Below the sill plates 75 are beams 76, and at the corners of the body, risers, such as 77, are secured to the beams 76. The sill plates 75, beams 76, risers 77 and forwardmost of the risers 31 in cooperation with beams 50', similar to the beams 50, define the driver's compartment, the forward ends of the beams 50' being secured to the upper ends of the risers 77 and being reenforced by brackets 78. Panels, such as 79, one of which may be arranged to be a door, close opposite sides of the driver's compartment, and the forward end is closed in the usual manner; that is, by a dashboard and a windshield (not shown). The foregoing is the manner in which one form of skeleton frame for my improved body may be formed. By referring to Fig. 2, it may be seen that the risers 31 at the rear of the body, are spaced apart in a relatively great amount, and this is to permit the mounting of door members thereon of approved construction, which will afford access into one compartment provided in the skeleton frame, in a manner to be described hereinafter.

A body constructed in the above described manner may include, as in the present instance, three compartments, the forwardmost of which is the driver's compartment, the intermediate of which is a compartment having insulated walls, while the rearwardmost is a compartment closed only by the ordinary panels provided on bodies of the character to which my invention appertains, and the doors heretofore described as being arranged at the rear of the body afford access into this last compartment.

The outer wall of my body may be made of wood, suitable metal, or a fabric such as canvas, as may be desired, and it may be made in panels or it may be made in one piece as desired. In the disclosed embodiment, panels are used and the panels on the sides of the body are retained in position by being suitably secured to furring strips, such as 80, which are arranged to extend horizontally, at spaced intervals, over the outer faces of the risers 31, said furring strips being secured to said risers. The side panels secured to the side strips are indicated by 81 and 82, and a suitable roof 83 is secured to the beams 70 and 71 in an approved manner.

Figure 14:
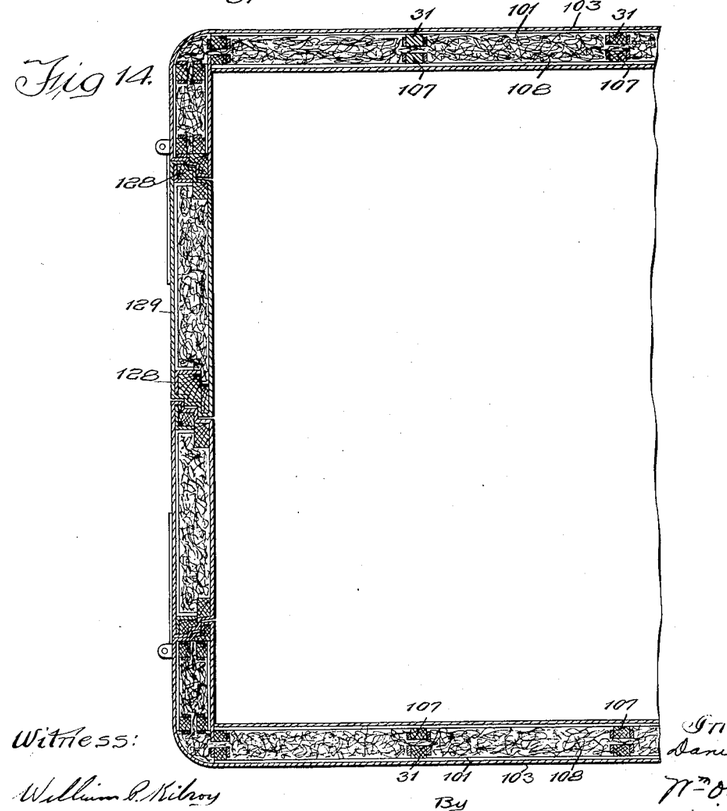
Fig. 14 is a fragmentary horizontal sectional view taken substantially on the line 14—14 on Fig. 13.
Figure 15:
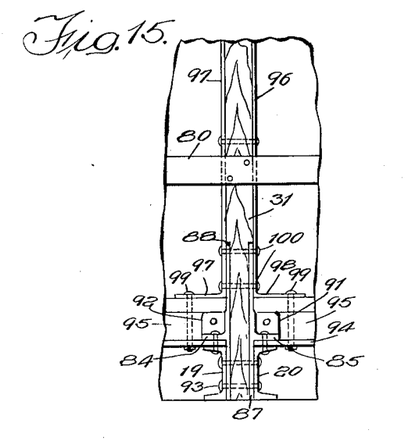
Fig. 15 is a view, similar to Fig. 4, showing the device as arranged in the embodiment of the invention illustrated in Figs. 13 and 14.
Figure 16:
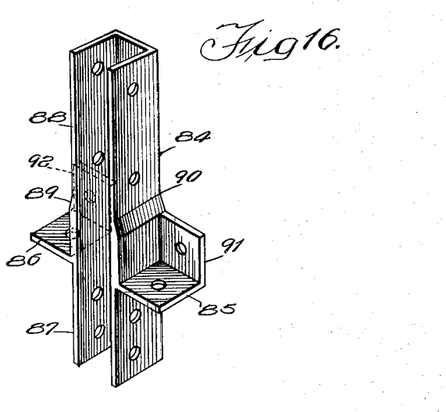
Fig. 16 is a perspective view of the bracket employed in the arrangement shown in Fig. 15.
Figure 17:
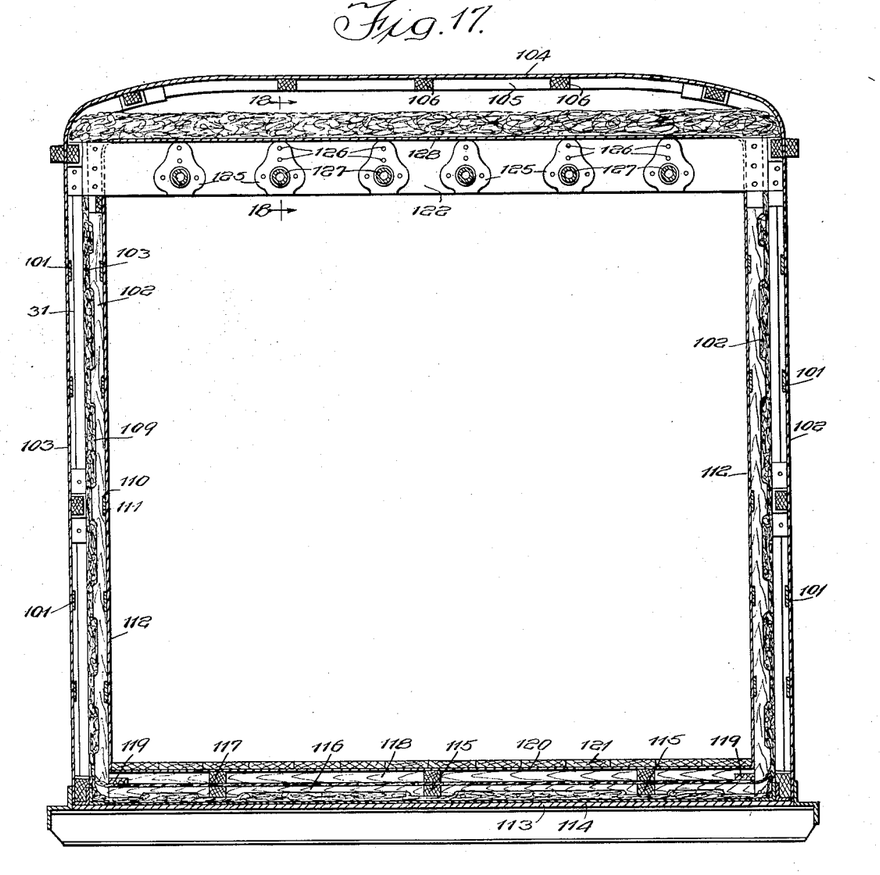
Fig. 17 is a vertical transverse sectional view taken substantially on the line 17—17 on Fig. 13.

An insulated compartment may be provided in a body of the above described construction or, if desired, the entire body, except the driver's compartment, may be arranged to include insulated walls so that the compartment defined by the insulated walls may be refrigerated for purposes well understood. A body constructed in this latter manner is disclosed in Figs. 13 to 18, inclusive, and by referring thereto it may be seen that this body includes and is mounted on a supporting platform which may be formed in the manner heretofore described; that is, channel irons 19 and 20 are arranged to extend transversely of the body and have wooden beams 21 arranged therebetween. However, in this instance, brackets 84 are used, in place of the brackets 22, at the ends of the beams 21 between the channel irons 19 and 20. A typical bracket 84 is illustrated in detail in Fig. 16, and by referring thereto it may be seen that this bracket includes horizontally disposed oppositely extending wings 85 and 86 having a vertical channel 87 intermediate thereof and depending therebelow, said wings and channel being unitary. Unitary with the channel 87 and extending upwardly in alignment therewith is a channel 88, the sides of which are reduced as indicated at 89 and 90, in the same manner as that in which the reduced sides 26 and 27 are provided on the bracket 22. Along the rear edge of the channel 84 and extending at right angles to the wings 85 and 86 are plates 91 and 92 which cooperate with the wings to provide L-shaped portions on opposite sides of the bracket, and these L-shaped portions correspond to plate 23. The manner in which the brackets 84 are installed is illustrated in Fig. 15, and by referring thereto it may be seen that the channel portion 87 thereof is disposed at the end of the beam 21 and between the bodies of the channel irons 19 and 20 and that the reduced lower end portion of a riser 31 is mounted in this channel. Rivets, such as 93, extend through the body of the channel irons and through openings in the sides of the channel 87 and through the riser 31 to secure said riser in position. A sill 94, similar to the sill 28, is retained between the upper surface of the upper flanges of the channel irons 19 and 20 and the lower surfaces of the wings 85 and 86. Beams 95 extend between brackets 84 on adjacent risers 31 above the sills 94. Side strips 96 and 97, substantially similar to the side strips 34 and 35, are secured to the sides of the riser 31, and these side strips include right angular extending foot portions 97 and 98, that are disposed on the upper surfaces of the beams 95. Rivets, such as 99, extend through the foot portions 97 and 98, beam 95, and sill 94 to secure the foot portions in position on the beam, and rivets, such as 100, extend through the side plates 95 and 96 and openings in the side walls of the channel 88, and the riser 31. The foregoing arrangement is provided at the lower end of each of the risers 31 along the sides of the body, and it is, therefore, manifest that a sturdy yet somewhat yieldable connection is provided. Risers 31 are provided at the rear end of the body, similar to the risers 31 provided at the rear end of the body in the disclosure depicted in Fig. 2, and a door structure to be described more fully hereinafter, is provided between these risers. Cross braces extend between the risers and are connected thereto by brackets 52, in the manner previously described, and corner brackets, such as 46 and 62, are provided at the upper ends of the risers to increase the rigidity of the structure and to provide a support for the roof of the body. Furring strips 101 are mounted on the outer faces of the risers 31 and outer side walls 102 and 103 are secured to these furring strips. A roof 104 is secured to beams 105 and 106, similar to the beams 70 and 71. To insulate the body, a suitable insulating material is arranged inwardly of the side walls and end walls and below the roof, and while any desired type of insulation may be provided I prefer to employ kapok, and in the preferred form of usage of this material I arrange it in blankets in the form of sacks including joined layers of a suitable fabric such as, for example, burlap. Kapok serves best as an insulator when it is arranged in a fluffy condition, but when required by the characteristics of the structure kapok may be compressed appreciably, and an example of this is that a two-inch blanket of kapok may be compressed to be but one-quarter of an inch in thickness, but preferably this compression of the blanket is used only where necessary. By reason of the soft fluffy nature of the kapok blanket, it is necessary that it be suitably supported at frequent intervals to prevent sagging thereof and to obviate the tendency of the material to collect along the lower edge of the blanket. In the embodiment of the invention illustrated in Figs. 13 to 18, inclusive, kapok is used as the insulating material and blankets thereof are arranged inwardly of the risers 31, and the material is fluffed out in the spaces between the risers, as best illustrated in Fig. 14. Manifestly, when a blanket is so suspended portions thereof will pass over the inner sides of the risers, and it is necessary that the blanket be flattened at these portions, for vertical furring strips 107 are arranged inwardly of the inner faces of the risers 31 and are suitably joined thereto as by nailing. Thus, as best illustrated in Fig. 17, the blanket 108 will be compressed in the space between the risers 31 and vertical furring strips 107. In order that the blanket will be compressed in as small an amount as possible, the faces of the furring strips 107 disposed toward the risers 31 are recessed as indicated at 109. In the face of the vertical extending furring strips 107, opposite the face having the recesses 109 therein, pockets 110 are provided in which horizontally extending furring strips 111 are arranged, and said furring strips 111 extend between the various furring strips 107. Secured to these furring strips 111 are sheets of metal 112 which provide a lining for the compartment defined within the body.

Disposed above the cross members, so as to provide a flat surface on the platform, is a plate 113 which is suitably secured to the cross members, and arranged above the plate are a series of strips 114 to which furring strips 115 are secured, and these furring strips 115 extend longitudinally of the body. If desired, additional furring strips 116 may be provided that may be extended transversely of the body. In the embodiment of the invention, illustrated in Figs. 13 to 18, inclusive, two blankets of insulating material may be provided, and when two such blankets are used one of the blankets will be disposed to rest on the strips 114 below the furring strips 115 while the other of the blankets will be directed above the furring strips 115. Disposed above and aligned with the furring strips 115 are furring strips 117, and furring strips are similarly arranged above the furring strips 116, and the last-named blanket is directed between the furring strips 115 and 116 and 117 and 118. The ends of the furring strips 117 are connected to supporting strips 119, arranged at opposite sides of the body. Rested on the furring strips 117 is a plate 120, and disposed above the plate 120 and extended longitudinally of the body are floor boards 121 preferably of hard wood, and these floor boards provide the floor for the compartment.

Figure 18:
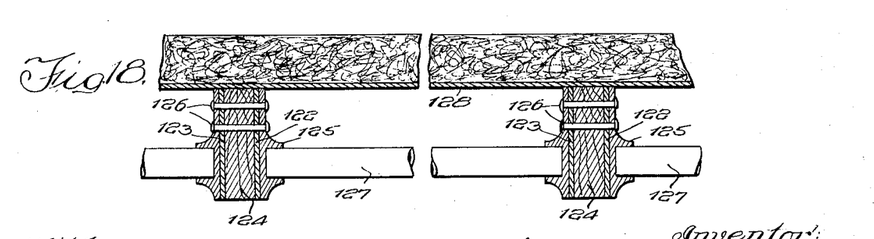
Fig. 18 is a sectional detail view taken substantially on the line 18—18 on Fig. 17.

It has been pointed out that it is often desirable to transport meat and similar perishable produce in bodies of the character to which this invention appertains, and such produce can best be handled by being hung from suitable supports. However, the weight of such produce is often relatively high, and it is, therefore, necessary that a sturdy construction be provided to support such produce. I, therefore, provide suitable openings in the plates 112 in alignment with the risers 31, and the end portions of strips 122 and 123 are extended through these openings and are connected to the plates 58 and 59 and to the risers 31, adjacent the upper ends of said risers, and the strips are also secured to the upper ends of furring strips 102. Disposed above the strips 122 and 123 and extending between the furring strips 102 are wooden beams 124. At suitable intervals along the strips 122 and 123, oppositely extending aligned brackets 124 and 125 are mounted, which are secured in position by rivets 126, as illustrated in Fig. 18. The brackets 125 and 126 includes sockets into which the ends of suspension rods 127 are extended, said rods extending between aligned brackets on juxtaposed beams, and appreciable weight may be suspended therefrom. It is in this manner that meat and similar perishable produce may be hung within the body. Arranged above the cross beams at the top of the body is a plate 128 which provides the top wall of the compartment and it is, therefore, apparent that the top, side, and end walls of the compartment are provided by metal plates and that the lower wall or floor is provided by suitable strips of hard wood. Since effective insulation is provided around the compartment thus defined, a very efficient arrangement results, and the device may, therefore, be very effectively refrigerated.

In order to afford access into the compartment a suitable door structure is provided, and this door structure includes vertical posts 128 between which suitable horizontally disposed rails are extended, which provide a frame, and a metal enclosure 129 is provided about the frame, and the metal enclosure is filled with kapok or other suitable insulating material. A stepped arrangement is provided around the edges of the doors, which effectively seals the door opening when the doors are in closing position, which manifestly will increase the efficiency of the device.

In the embodiment of the invention, as best illustrated in Fig. 2, an insulated compartment is provided which is arranged in the intermediate portion of the body, as above described. This compartment is disposed between certain of the risers 31, and in the present instance is arranged between three risers on each side of the device. Inwardly of the intermediate risers 31, furring strips 130 are provided, and along the front and rear walls are risers 132, similar to the risers 31, and furring strips 130 are arranged inwardly of the risers 132. Suitable metal plates 133 are arranged on the furring strips 132, and the edges are secured to the risers 31 at the corners of the compartment, and these metal plates cooperate with the paneling on the outer face of the body to define a compartment, and arranged inwardly of the outer walls of this compartment is a suitable insulation, such as kapok, which is supported in the manner previously described. The inner walls of the compartments are defined by suitable metal plates, joined in an approved manner, and connected to the furring strips 130. A frame comprising rails 134 is provided around the body adjacent the corners thereof. A suitable door structure 135 is provided which affords access into the interior of the compartment thus defined.

It is manifest from the foregoing description that I have provided a body construction which may be readily adapted for mounting on the chassis of an automotive truck, and that I have provided a body construction which is adaptable for use on chassis of different constructions. Since I have provided a platform as a part of my improved body construction, and as it is this platform that may be secured to the chassis, it is manifest that the entire body construction may be built as a unit. Further, since I have provided a body construction in which metal strips are combined with wooden beams, it is manifest that I have provided a construction which is sturdy, yet not so excessively rigid as to cause shearing of securing bolts and the like. Moreover, by combining wooden beams with metal strips I am enabled to use a relatively light metal, such as aluminum, which will appreciably reduce the weight of the body and by reducing the weight of the body, it will be possible to carry a greater pay load on the truck than is possible in trucks which have body construction including a relatively heavy metal, for it is obvious that it is immaterial whether or not the weight impressed on the truck is that of a body construction or one of a pay load, as only a definite amount of weight can be loaded on the truck. The marked advantage of using a sturdy body of light construction is, therefore, apparent. Further, my body construction is effectively reenforced and, therefore, distortion and weaving thereof is substantially eliminated.

In the foregoing description I have set forth two selected embodiments of my invention, but it is to be understood that this device might be constructed in other ways without departing from the purview of the invention and I, therefore, wish to avail myself of all variations and modifications falling within the scope of the following claims.

I claim:

1. In a body construction which has parallel flat reenforcing plates, and a riser disposed between said reenforcing plates, the combination therewith of a bracket for securing said reenforcing plates and riser in position and including side plates and a web connecting said side plates, said side plates and web providing a channel adapted to receive the riser, attaching members extending outwardly from the side plates intermediate the ends thereof, said side plates having openings therein, and securing devices inserted through the openings in said side plates and openings in the reenforcing plates and riser to secure the reenforcing plates to the side plates of the bracket and to secure the riser in the channel.

2. In a body construction which has parallel flat plates, and a riser disposed between said plates, the combination therewith of a bracket for securing said plates and riser in position and including a channel adapted to receive the riser, a plate extending from the closed sides of said channel intermediate the ends thereof, and integral pads on the sides of said channel adjacent said plate and adapted to reenforce said channel adjacent said plate, said channel having openings in the sides thereof adapted to receive securing devices for attaching said plates to the sides of the channel of the bracket and for securing said riser in said channel.

3. In a body construction which has parallel flat plates, and a riser disposed between said plates, the combination therewith of a bracket for securing said plates and riser in position and including a channel adapted to receive the riser, said channel having integral pads on the sides and intermediate the ends thereof, and attaching devices integral with the bracket and extending outwardly from the pads on the sides of the channel, said pads strengthening said bracket at the places whereat said attaching devices are joined therewith, and said channel having openings in the sides thereof adapted to receive securing devices for attaching the plates to the sides of the channel of the bracket and for securing said riser in said channel.

4. In a body construction which has parallel flat plates, and a riser disposed between said plates, the combination therewith of a bracket for securing said plates and riser in position and including a channel adapted to receive the riser, said channel having a straight portion wherein said riser is arranged and including a portion extending at an angle to said straight portion, attaching devices on the side walls of the straight portion of the channel, and said channel having openings in the sides of the straight portion thereof adapted to receive securing devices for attaching the plates to the sides of the channel of the bracket and for securing said riser in said channel.

5. In a body construction which has a riser and a pair of beams arranged one above the other and extending at an angle to the riser, the combination therewith of a bracket for securing said riser and beams in position and including a channel having a straight portion adapted to receive the riser and a portion adapted to receive the upper beam, said bracket having the web of said channel thickened at the juncture of the portions of said channel to effectively reenforce the portion to receive the upper beam, and means on the bracket to receive the end of the lower beam, said channel having openings in the sides of the straight portion thereof adapted to receive fastening devices for securing the riser in the straight portion of said channel.

6. A bracket for use in a body construction and including channels embodying parallel portions and other portions extending at angles to the parallel portions and toward each other, the end of one of said angularly extending portions merging into the side of the other of the angularly extending portions, and attaching means on the sides of said parallel portions.

7. A bracket for use in a body construction and including channels embodying parallel portions and other portions extending at angles to the parallel portions and toward each other, the end of one of said angularly extending portions merging into the side of the other of the angularly extending portions, means interconnecting the parallel channel portions, and means aligned with the interconnecting means and disposed on the opposite sides of said parallel portions of the channel and providing attaching portions.

DANIEL W. VOLTZ.